(12) United States Patent
Nakamura

(10) Patent No.: US 11,491,568 B2
(45) Date of Patent: Nov. 8, 2022

(54) METHOD FOR MANUFACTURING SOLENOID SLEEVE

(71) Applicant: HITACHI METALS, LTD., Tokyo (JP)

(72) Inventor: Yoshinobu Nakamura, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 840 days.

(21) Appl. No.: 16/337,788

(22) PCT Filed: Sep. 28, 2017

(86) PCT No.: PCT/JP2017/035240
§ 371 (c)(1),
(2) Date: Mar. 28, 2019

(87) PCT Pub. No.: WO2018/062396
PCT Pub. Date: Apr. 5, 2018

(65) Prior Publication Data
US 2019/0275601 A1 Sep. 12, 2019

(30) Foreign Application Priority Data
Sep. 30, 2016 (JP) .............................. JP2016-193747

(51) Int. Cl.
*H01F 7/06* (2006.01)
*B23K 9/00* (2006.01)
(Continued)

(52) U.S. Cl.
CPC .............. *B23K 9/0026* (2013.01); *B23K 9/00* (2013.01); *B23K 20/00* (2013.01); *H01F 7/121* (2013.01); *H01F 7/16* (2013.01); *H01F 41/02* (2013.01)

(58) Field of Classification Search
CPC ........ B23K 9/00; B23K 9/0026; B23K 20/00; H01F 7/16; H01F 7/121; H01F 41/02
See application file for complete search history.

(56) References Cited

U.S. PATENT DOCUMENTS 5,069,420 A * 12/1991 Stobbs .................. B60T 8/3665
251/129.08
5,865,907 A 2/1999 Katayama et al.
(Continued)

FOREIGN PATENT DOCUMENTS

CN 102233507 A 11/2011
EP 2568481 A1 3/2013
(Continued)

OTHER PUBLICATIONS

Office Action of corresponding Japanese Patent Application No. 2018-542862: Notice of Reasons for Refusal dated May 27, 2021 (4 sheets, 5 sheets translation, 9 sheets total).
(Continued)

*Primary Examiner* — Paul D Kim
(74) *Attorney, Agent, or Firm* — Kratz, Quintos & Hanson, LLP

(57) ABSTRACT

A non-magnetic member, a first magnetic member and a second magnetic member are prepared. The first magnetic member and the second magnetic member are connected to the non-magnetic member. Then, a first bonding portion which bonds the non-magnetic member and the first magnetic member to each other, and a second bonding portion which bonds the non-magnetic member and the second magnetic member to each other are formed. A hot isostatic pressing process is performed to the non-magnetic member, the first magnetic member and the second magnetic member to establish diffusion-bond. Thereafter, the non-magnetic member, the first magnetic member and the second magnetic member are hollowed, and the first bonding portion and the
(Continued)

second bonding portion are removed. Thereafter, the non-magnetic member becomes a non-magnetic body, the first magnetic member becomes a first magnetic body, the second magnetic member becomes a second magnetic body and a sleeve is obtained.

3 Claims, 10 Drawing Sheets

(51) Int. Cl.
*H01F 7/121* (2006.01)
*H01F 7/16* (2006.01)
*H01F 41/02* (2006.01)
*B23K 20/00* (2006.01)

(56) References Cited

U.S. PATENT DOCUMENTS

| | | | |
|---|---|---|---|
| 7,891,712 B2 * | 2/2011 | Herelier | F17C 13/04 285/369 |
| 2009/0140189 A1 | 6/2009 | Kokubu et al. | |

FOREIGN PATENT DOCUMENTS

| | | |
|---|---|---|
| JP | 54-35151 A | 3/1979 |
| JP | 1-273681 A | 11/1989 |
| JP | 4-263407 A | 9/1992 |
| JP | 5-104259 A | 4/1993 |
| JP | 5-228653 A | 9/1993 |
| JP | 6-23567 A | 2/1994 |
| JP | 7-11397 A | 1/1995 |
| JP | 8-319802 A | 12/1996 |
| JP | 9-320840 A | 12/1997 |
| JP | 11-251138 A | 9/1999 |
| JP | 2001-6925 A | 1/2001 |
| JP | 2002-231546 A | 8/2002 |
| JP | 2007-245211 A | 9/2007 |
| JP | 2012-38780 A | 2/2012 |
| WO | 2009066579 A1 | 5/2009 |

OTHER PUBLICATIONS

International Preliminary Report on Patentability for International Application No. PCT/JP2017/035240 dated Apr. 11, 2019 (2 pages).
Written Opinion of the International Searching Authority for International Application No. PCT/JP2017/035240 dated Dec. 26, 2017 (6 pages).

* cited by examiner

100

METHOD FOR MANUFACTURING SOLENOID SLEEVE

TECHNICAL FIELD

The present invention relates to a method for manufacturing a solenoid sleeve, and more specifically to a method for manufacturing a sleeve of a high-pressure solenoid.

BACKGROUND ART

In solenoids which are generally utilized for fluid flow control for example, and particularly in a proportional solenoid, recently, there is an increasing demand for operation under high pressures. The solenoid includes a sleeve as a member. In the proportional solenoid for example, the sleeve has a structure in which a tubular (annular) non-magnetic member which has its one end surface tapered is sandwiched with hollow ferromagnetic members each having an end surface matched to the shape of the corresponding end surface of the non-magnetic member. Controlling the shape of taper (angle) of the end portion of the non-magnetic member is important for accurate flow control. Also, as a characteristic required for use under high pressure environment, the solenoid sleeve must have a high bonding strength between the non-magnetic member and the ferromagnetic member.

As an example of a conventional method for manufacturing a member of this kind, Patent Literature 1 discloses a method in which a ferromagnetic metal and a non-magnetic metal are laminated each other and made into an assembly, which is then inserted into a metal sheath, and after performing deaeration, sealing and other procedures as necessary, the assembly is subjected to hot working. The literature notes that hot extruding is the most appropriate among various hot working processes but the disclosure also notes that there may be a two-step procedure in which bonding by means of HIP process or the like is followed by hot forging or hot rolling for stretching the work in the direction of lamination.

Also, other conventional techniques are disclosed in Patent Literature 2. With reference to FIG. 6 in that literature, there is disclosed a method for obtaining a diffusion-bonded member by vacuum sealing a subject material as a whole into a metal capsule and performing an HIP process. Also, with reference to FIG. 7 therein, there is disclosed a method for obtaining a diffusion-bonded member by first welding thereby sealing surroundings of a region of subject materials to be bonded to each other and then by performing an HIP process.

CITATION LIST

Patent Literature

PATENT LITERATURE 1: JP-A H11-251138
PATENT LITERATURE 2: JP-A H5-228653

SUMMARY OF INVENTION

Technical Problem

The method for manufacturing according to Patent Literature 1 requires the sheath for performing the HIP process, which leads to cost increase for that part. Also, after the assembly is inserted into the sheath, processes such as deaeration and sealing must be performed as necessary for enhanced bond between the ferromagnetic metal/non-magnetic metal, i.e., the method requires a lot of steps. In a case like high pressure solenoid sleeves where a high bonding strength is required, these processes are indispensable. Further, the sheath becomes unnecessary after the HIP process and must be ground off, which means the method requires a longer machining time for this step. Also, after the HIP process, hot forging or hot rolling is employed to stretch in the direction of lamination, and further, preferably, in order to make the non-magnetic metal portion into a preferable shape as an electromagnetic coil sleeve, the literature says that the material which was stretched in the hot working process is then subjected to a cold working in which the material is processed in the opposite direction from the direction in which the hot working was performed. However, in any of these methods, it is difficult to control the angle of the tapered portion at the end region of the non-magnetic metal.

Also, Patent Literature 2 discloses nothing about bonding between different materials, i.e., between a ferromagnetic metal and a non-magnetic metal, which is disclosed in Patent Literature 1. It does not disclose or indicate utilization of the obtained diffusion-bonded member in manufacture of a solenoid sleeve; particularly, shape controlling of the member which is subjected to the diffusion bonding; or problems of characteristic alteration caused by welding and solution thererto. Also, in the method of using a capsule, the capsule portion must be removed after the HIP process, but precision removal of the capsule is difficult because position accuracy of the capsule is low. Another problem is that machining can be very difficult depending on the material of the capsule.

Therefore, a primary object of the present invention is to provide a method for manufacturing a solenoid sleeve which has a non-magnetic body of a desired shape, suitable for use in a high pressure environment, and obtained easily at a low cost.

Solution to Problem

According to an aspect of the present invention, there is provided a method for manufacturing a solenoid sleeve, comprising: a first step of preparing a non-magnetic member including a first tapered portion recessing with a decreasing diameter from its first axial end region side toward its second axial end region side, a first magnetic member including a second tapered portion with a decreasing diameter from its first axial end region side toward its second axial end region side for fitting to the first tapered portion, and a second magnetic member; a second step of fitting the second tapered portion to the first tapered portion thereby connecting the first magnetic member to the first axial end region of the non-magnetic member, and connecting the second magnetic member to the second axial end region of the non-magnetic member; a third step of forming a first bonding portion which bonds the non-magnetic member and the first magnetic member along an outer circumferential portion of a connecting region between the non-magnetic member and the first magnetic member including a fitting region between the first tapered portion and the second tapered portion, to seal the connecting region, and forming a second bonding portion which bonds the non-magnetic member and the second magnetic member along an outer circumferential portion of a connecting region between the non-magnetic member and the second magnetic member, to seal the connecting region between the non-magnetic member and the second magnetic member; a fourth step of performing a hot isostatic pressing process to the non-magnetic member, the first magnetic member and the second magnetic member bonded in the third step, to diffusion-bond the non-magnetic member and the first magnetic member with each other, and diffusion-bond the non-magnetic member and the second magnetic member with each other; and a fifth step of hollowing the non-magnetic member, the first magnetic member and the second magnetic member and removing the first bonding portion and the second bonding portion to leave at least part of the diffusion-bonded portion of the first tapered portion and of the second tapered portion, thereafter obtaining a cylindrical sleeve formed by sandwiching a non-magnetic body between a first magnetic body and a second magnetic body. In this arrangement, by the fifth step, the non-magnetic member is brought into the annular non-magnetic body including at least part of the first tapered portion, the first magnetic member is brought into the hollow first magnetic body including at least part of the second tapered portion, at least part of the second tapered portion is diffusion-bonded to at least part of the first tapered portion at a first axial end region of the non-magnetic body, and the second magnetic member is brought into the hollow second magnetic body diffusion-bonded to a second axial end region of the non-magnetic body.

In the present invention, in the third step, the first bonding portion which bonds the non-magnetic member and the first magnetic member is formed to seal the connecting region between the non-magnetic member and the first magnetic member that includes the fitting region between the first tapered portion and the second tapered portion; and the second bonding portion which bonds the non-magnetic member and the second magnetic member is formed to seal the connecting region between the non-magnetic member and the second magnetic member. Thereafter, in the fourth step, the hot isostatic pressing (HIP) process is performed for establishing diffusion-bonding between the non-magnetic member and the first magnetic member under compression, and diffusion-bonding between the non-magnetic member and the second magnetic member under compression. Therefore, it is possible to increase bonding strength between the non-magnetic member, the first magnetic member and the second magnetic member without causing alteration of the angles of the first tapered portion and of the second tapered portion. Also, there is no need for vacuum sealing which would require, e.g., a separately prepared capsule, to perform the hot isostatic pressing process, and therefore the invention makes it easy to manufacture the sleeve, making it possible to reduce cost. Further, there is no need to grind off the capsule and the like which become no longer necessary after the hot isostatic pressing process. Therefore, it is possible to perform machining processes accurately and easily. Also, even if the first bonding portion and the second bonding portion become altered or deformed as a result of the bonding process, the first bonding portion and the second bonding portion are removed in the fifth step, so it is possible to prevent the sleeve, and eventually the solenoid, from being lowered in quality. Therefore, it is possible to obtain a solenoid sleeve which has the non-magnetic body of the desired shape and is suitable for use in high pressure environments, easily at a low cost.

Preferably, the non-magnetic member includes a first annular portion protruding annularly at the first axial end region side of the non-magnetic member, and a second annular portion protruding annularly at the second axial end region side of the non-magnetic member; and the first magnetic member is pressed into the first annular portion, thereby connected to the non-magnetic member, whereas the second magnetic member is pressed into the second annular portion thereby connected to the non-magnetic member, in the second step. In this case, by forming the first annular portion and the second annular portion longer by some extent, or by increasing an outer diameter of the first annular portion and the second annular portion by some extent, for example, i.e., by forming the first annular portion so that at least part of the first tapered portion and the second tapered portion which is to be left after a cutting process performed in the fifth step is separated from the first bonding portion by an increased distance, and by forming the second annular portion so that at least part of a main surface of the second magnetic member side in the non-magnetic member and a main surface of the non-magnetic member side in the second magnetic member which is to be left after the cutting process performed in the fifth step is separated from the second bonding portion by an increased distance, it becomes possible to prevent the first bonding portion from being formed at least onto a portion of the first tapered portion and the second tapered portion which is left after the cutting process in the fifth step, and to prevent the second bonding portion from being formed at least onto a portion of the main surface of the second magnetic member side in the non-magnetic member and the main surface of the non-magnetic member side in the second magnetic member which is left after the cutting process performed in the fifth step. This makes it possible that at least a portion of the first tapered portion and the second tapered portion which is left after the cutting process in the fifth step is not deformed or altered but keeps its shape and characteristics and that at least a portion of the main surface of the second magnetic member side in the non-magnetic member and the main surface of the non-magnetic member side in the second magnetic member which is left after the cutting process performed in the fifth step is not deformed or altered but keeps its shape and characteristics, leading to good diffusion bonding by the later hot isostatic pressing process.

Further preferably, in the third step, the first bonding portion and the second bonding portion are formed by arc welding. In this case, arc welding is a welding which is performed while an arc generated from a welding wire is covered by argon gas, carbon dioxide gas or the like, and therefore atmospheric air does not enter, keeping the bonding surface between the first magnetic member and the non-magnetic member, and the bonding surface between the second magnetic member and the non-magnetic member less susceptible to atmospheric oxidization. This makes it possible, in the later fourth step, to make good diffusion bonding between the first magnetic member and the non-magnetic member, and between the second magnetic member and the non-magnetic member, by the hot isostatic pressing process.

Further, preferably, the arc welding is provided by TIG welding. In TIG (Tungsten Inert Gas) welding, a tungsten electrode is brought closely to the work, so that heat from electric discharge melts the work. Since the heat spreads easily, it is possible to widely and reliably bond the connecting region on the outer circumference side. In this case, it is possible to easily and reliably seal the connection region between the non-magnetic member and the first magnetic member, and the connection region between the non-magnetic member and the second magnetic member. Therefore, it is possible to reliably diffusion-bond the non-magnetic member and the first magnetic member to each other, and the non-magnetic member and the second magnetic member to each other by the hot isostatic pressing process. Also, in TIG welding, heat tends to spread in surface directions and does not tend to make a bond deep inside the connecting region. This makes it possible to reliably bond only necessary areas.

Advantageous Effects of Invention

According to the present invention, it is possible to obtain a solenoid sleeve which has a non-magnetic body of the desired shape and is suitable for use in high pressure environments, easily at a low cost.

DESCRIPTION OF EMBODIMENTS

Hereinafter, preferred embodiments of the present invention will be described with reference to the drawings.

Figure 1:
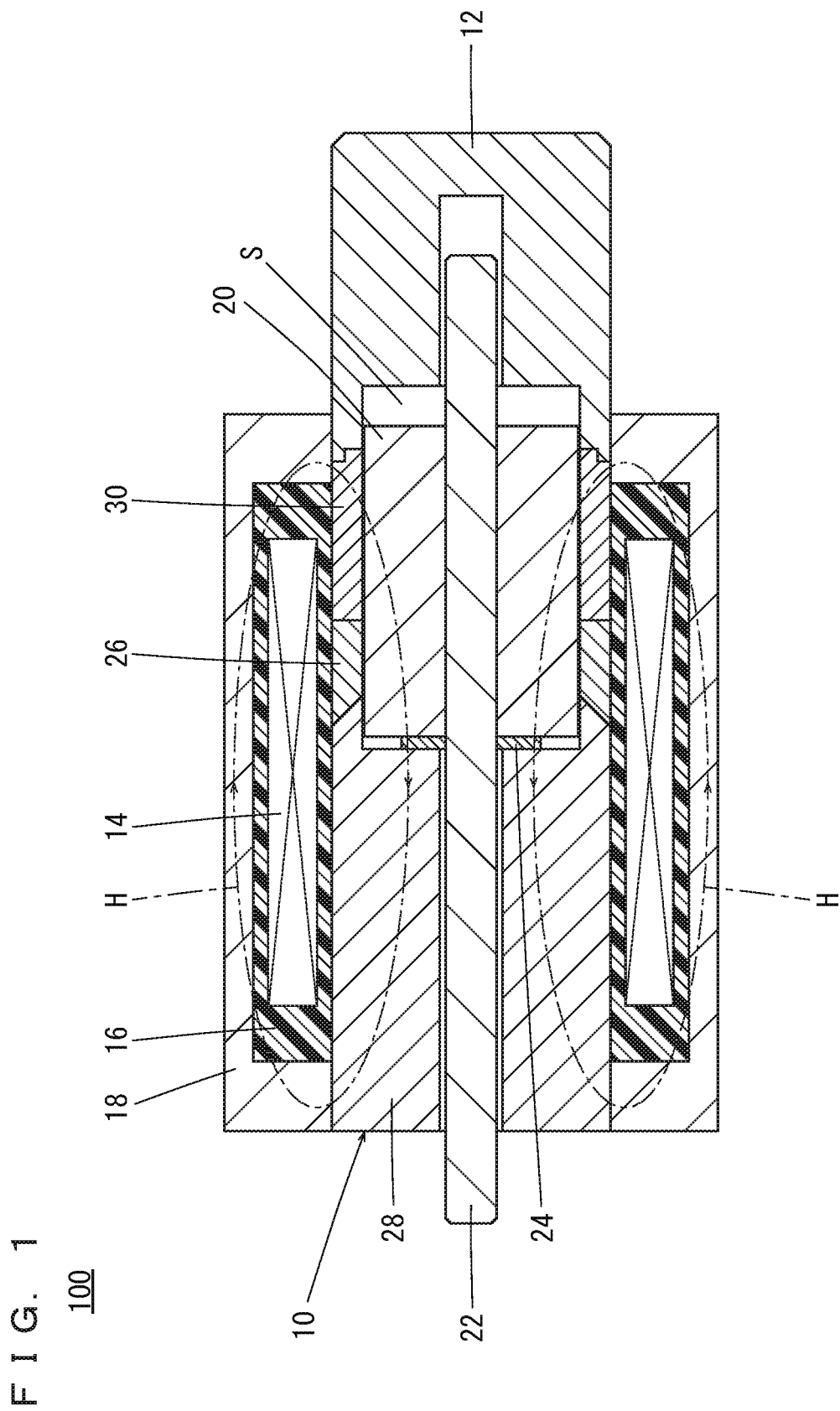
FIG. 1 is a sectional view which shows a solenoid including a sleeve manufactured in a method of manufacturing a solenoid sleeve according to an embodiment of the present invention.

FIG. 1 is a sectional view which shows a solenoid 100 including a sleeve 10 manufactured in a method of manufacturing a solenoid sleeve according to an embodiment of the present invention. The solenoid 100 includes the sleeve 10, a lid member 12, a coil 14, a resin member 16, a case 18, a movable iron core 20, a rod 22, and a spacer 24. The sleeve 10 is formed in a cylindrical shape including a non-magnetic body 26 sandwiched by a first magnetic body 28 and a second magnetic body 30, and functions as a fixed magnetic pole. The lid member 12 functions as a stopper, and is attached to the second magnetic body 30. The coil 14, which is molded into the resin member 16, is wound around the sleeve 10. The case 18 is formed in a cylindrical shape, and is attached to the sleeve 10 and the lid member 12 to cover the coil 14 and the resin member 16 from outside. The movable iron core 20 is formed in a cylindrical shape, and is placed inside a space S provided by the sleeve 10 and the lid member 12. The rod 22, which is formed like a bar, penetrates the movable iron core 20 and is fixed to the movable iron core 20. The rod 22 is movable in a reciprocating manner together with the movable iron core 20 inside the sleeve 10. The spacer 24 is formed in an annular shape for example, and is provided at an axial end portion of movable iron core 20, around an outer circumference of the rod 22.

In the solenoid 100 described above, as an electric current is applied to the coil 14, a magnetic field H is generated and the movable iron core 20, the first magnetic body 28 and the second magnetic body 30 are magnetized. In this process, due to the existence of the non-magnetic body 26, the magnetic flux of the magnetic field H generated by the coil 14 spreads through the first magnetic body 28 and the second magnetic body 30, to the movable iron core 20. This makes it possible to strongly magnetize the movable iron core 20. Before the electric current is applied to the coil 14, the movable iron core 20 has its end surface which faces the lid member 12, in contact with the lid member 12. As the electric current is applied to the coil 14 and the magnetic field H is generated, the magnetized movable iron core 20 is pulled by the magnetized first magnetic body 28, and the movable iron core 20 and the rod 22 move inside the sleeve 10 to a position shown in FIG. 1. It should be noted here that the rod 22 is under a constant urge from an unillustrated spring for example, toward the lid member 12. When the supply of electric current to the coil 14 is stopped, the movable iron core 20 and the rod 22 move toward the lid member 12.

The solenoid 100 is utilized suitably in a hydraulic solenoid valve for example, for operation in a high pressure environment as a proportional solenoid from a view point of reducing waste of energy through fine control of flow and/or pressure. In cases where the solenoid 100 is utilized as a proportional solenoid, the shape of a tapered portion at the end region of the first magnetic body 28 (part 51 of a second tapered portion 50 which will be described later: See FIG. 7) is important. A reason for this is that in this arrangement, the shape of the tapered portion at the end region of the first magnetic body 28 and properties of the added spring give certain specific characteristics which regulates the location of the movable iron core 20 corresponding to the amount of electric current flowing through the coil 14, and deformation and/or quality change in the tapered portion alters the characteristics. Also, regardless of whether or not the solenoid 100 is used as a proportional solenoid, the tapered portion at the end region of the first magnetic body 28 increases the force to pull the movable iron core 20.

Hereinafter, a method for manufacturing the sleeve 10 according to an embodiment of the present invention will be described.

First, as the first step, as shown in FIG. 2(a) through FIG. 2(c), a first magnetic member 34, a non-magnetic member 32 and a second magnetic member 36 are prepared.

Referring to FIG. 2(b) the non-magnetic member 32 is formed in a generally disc-like shape, and includes a main body 38, a first annular portion 40 and a second annular portion 42. The main body 38 is formed in a disc-like shape, and includes a first recess 46 which has a first tapered portion 44 recessing with a decreasing diameter from a first axial end region of the main body 38 (which is an end region closer to the first magnetic member 34) toward a second axial end region side (toward the second magnetic member 36) thereof. The first annular portion 40 protrudes axially of the main body 38 from an outer circumferential portion of the main body 38 at the first axial end region of the main body 38, and is formed annularly. The second annular portion 42 protrudes axially of the main body 38 from an outer circumferential portion of the main body 38 at the second axial end region of the main body 38 (which is the end region closer to the second magnetic member 36), and is formed annularly. As described, the first tapered portion 44 recesses from a first axial end region side (facing the first magnetic member 34) of the non-magnetic member 32 toward a second axial end region side (facing the second magnetic member 36) thereof, with a decreasing diameter. The first annular portion 40 is formed at the first axial end region side of the non-magnetic member 32, to protrude annularly. The second annular portion 42 is formed at the second axial end region side of the non-magnetic member 32, to protrude annularly.

The first annular portion 40 and the second annular portion 42 respectively represent protrusions for holding around a first projected portion 48 of the first magnetic member 34 in FIG. 2(a) and a second projected portion 52 of the second magnetic member 36 in FIG. 2(c) when they are pressed in and fitted.

Referring to FIG. 2(a), the first magnetic member 34 is formed cylindrically, and includes the first projected portion 48. The first projected portion 48 is formed to protrude like a disc, from a first axial end region side (which is the opposite side from the non-magnetic member 32) of the first magnetic member 34 toward a second axial end region side (toward the non-magnetic member 32) thereof, and is at the second axial end region of the first magnetic member 34. Also, the first projected portion 48 has the second tapered portion 50 around an outer circumferential portion of a tip of the first projected portion 48, with a diameter decreasing from the first axial end region side toward the second axial end region side of the first magnetic member 34 so as to fit into the first tapered portion 44. The first projected portion 48 has its diameter D1 made slightly greater than an inner diameter D2 of the first annular portion 40 so that the first projected portion 48 can be pressed into the first annular portion 40. The first tapered portion 44 and the second tapered portion 50 have substantially the same pitch so that the first tapered portion 44 and the second tapered portion 50 can be mated with each other when the first projected portion 48 is pressed into the first annular portion 40.

Referring to FIG. 2(c), the second magnetic member 36 is formed cylindrically, and includes the second projected portion 52. The second projected portion 52 is at a first axial end region of the second magnetic member 36 (which is an end region facing the non-magnetic member 32), and protrudes like a disc, from a second axial end region side (which is the opposite side from the non-magnetic member 32) of the second magnetic member 36 toward the first axial end region side (toward the non-magnetic member 32) thereof. The second projected portion 52 has its diameter D3 made slightly greater than an inner diameter D4 of the second annular portion 42 so that the second projected portion 52 can be pressed into the second annular portion 42.

In the present embodiment, the non-magnetic member 32, the first magnetic member 34 and the second magnetic member 36 have a surface roughness Ra of approximately 3.2. The non-magnetic member 32 is made of stainless steel (e.g., SUS304), while the first magnetic member 34 and the second magnetic member 36 are made of soft steel (e.g., SS400). Also, in order to prevent, as much as possible, any foreign matters (dirt, oil, cleansing liquid, rust, etc.) from entering between the non-magnetic member 32 and the first magnetic member 34, or between the non-magnetic member 32 and the second magnetic member 36 in the subsequent step, the non-magnetic member 32, the first magnetic member 34 and the second magnetic member 36 are cleaned in advance. The cleaning can be achieved in conventional methods, so details thereof will not be discussed here.

Figure 2:
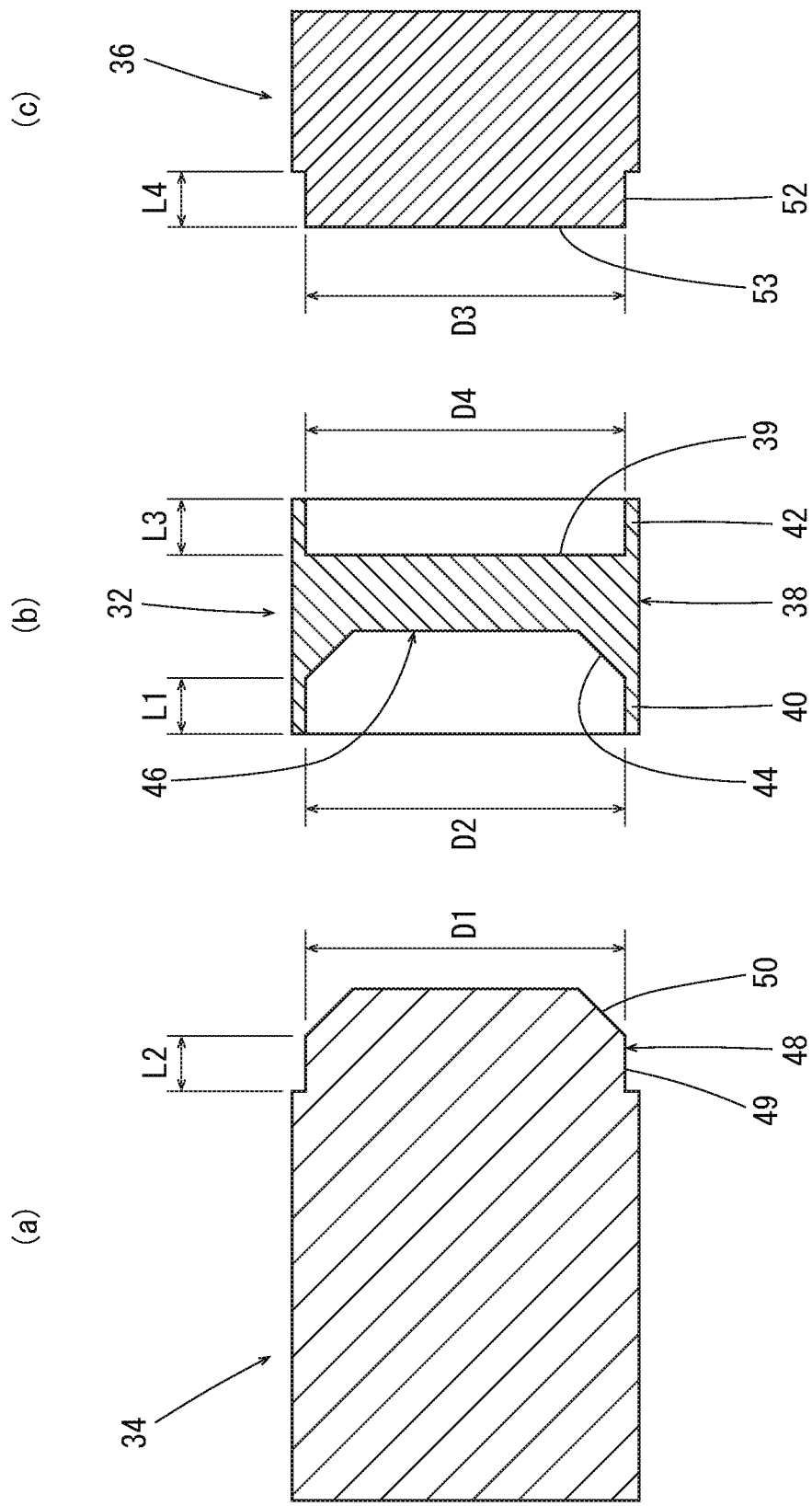
FIG. 2(a) is a sectional view which shows a first magnetic member.
FIG. 2(b) is a sectional view which shows a non-magnetic member.
FIG. 2(c) is a sectional view which shows a second magnetic member.
Figure 3:
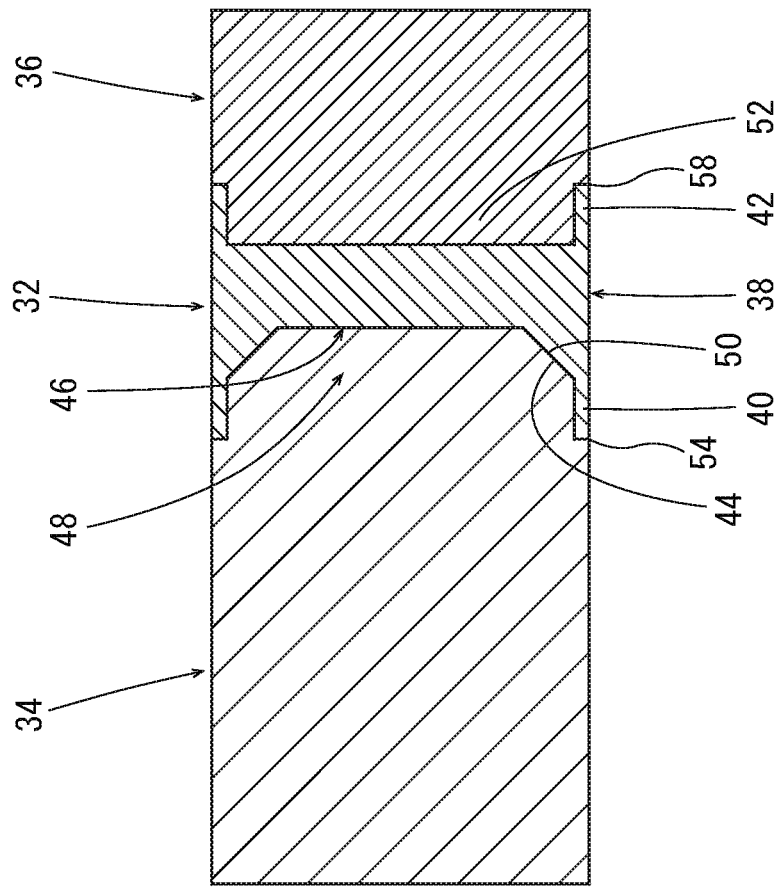
FIG. 3 is a sectional view which shows a state where the first magnetic member and the second magnetic member are connected to the non-magnetic member.

Next, as the second step, as shown in FIG. 3, the first magnetic member 34 and the second magnetic member 36 are fitted into the non-magnetic member 32 and connected thereto. First, the first annular portion 40 side of the non-magnetic member 32 and the first projected portion 48 side of the first magnetic member 34 are opposed to each other. Next, the first magnetic member 34 is moved toward the non-magnetic member 32, whereby the first projected portion 48 is pressed into the first annular portion 40. As has been described earlier, the diameter D1 of the first projected portion 48 is slightly greater than the inner diameter D2 of the first annular portion 40 (see FIG. 2). Therefore, the first projected portion 48 is fitted by the first annular portion 40 with very little gap. Then, the first magnetic member 34 is pressed in firmly until the second tapered portion 50 fits into the first tapered portion 44 and the first magnetic member 34 can no longer be moved toward the non-magnetic member 32. Dimensions of the non-magnetic member 32 and the first magnetic member 34 are selected so that this step leaves no gap or a minimum gap between the tip of the first projected portion 48 and the main body 38. This ensures that the non-magnetic member 32 and the first magnetic member 34 are reliably diffusion-bonded in the fourth step. As described, the first magnetic member 34 is pressed into the first annular portion 40 to fit the second tapered portion 50 into the first tapered portion 44, thereby connecting the first magnetic member 34 to the first axial end region of the non-magnetic member 32.

Likewise, the second annular portion 42 side of the non-magnetic member 32 and the second projected portion 52 side of the second magnetic member 36 are opposed to each other. Next, the second magnetic member 36 is moved toward the non-magnetic member 32, whereby the second projected portion 52 is pressed into the second annular portion 42. As has been described earlier, the diameter D3 of the second projected portion 52 is slightly greater than the inner diameter D4 of the second annular portion 42 (see FIG. 2). Therefore, the second projected portion 52 is fitted by the second annular portion 42 with very little gap. Then, the second magnetic member 36 is pressed in firmly until the second magnetic member 36 can no longer be moved toward the non-magnetic member 32. Dimensions of the non-magnetic member 32 and the second magnetic member 36 are selected so that this step leaves no gap or a minimum gap between the tip of the second projected portion 52 and the main body 38. This ensures that the non-magnetic member 32 and the second magnetic member 36 are reliably diffusion-bonded in the fourth step. As described, the second magnetic member 36 is pressed into the second annular portion 42 whereby the second magnetic member 36 is connected to the second axial end region of the non-magnetic member 32.

Figure 4:
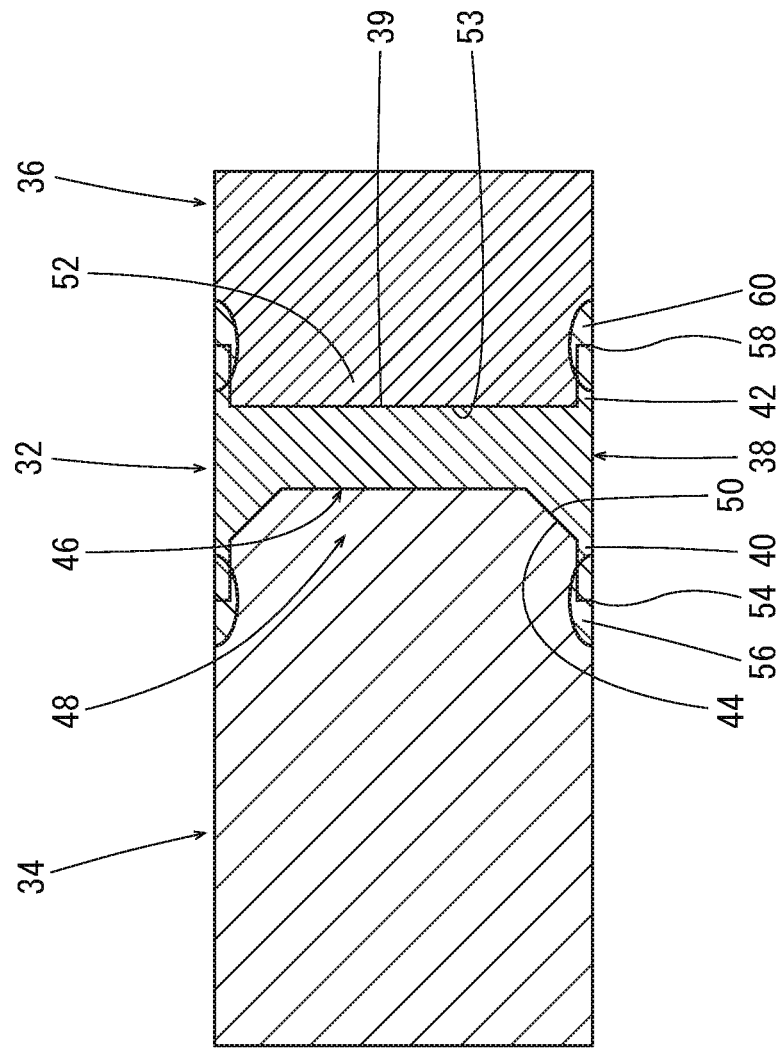
FIG. 4 is a sectional view which shows a state where the non-magnetic member and the first magnetic member are bonded to each other, and the non-magnetic member and the second magnetic member are bonded to each other.

As the third step, welding for example, is performed to make bonding portions. Referring to FIG. 4, in order to prevent atmospheric air from entering the connecting region between the non-magnetic member 32 and the first magnetic member 34 (where the first projected portion 48 is opposed to the first recess 46 and the first annular portion 40) when a hot isostatic pressing is performed, welding is performed around an outer circumferential portion 54 of the connecting region. The connecting region between the non-magnetic member 32 and the first magnetic member 34 includes a fitting region between the first tapered portion 44 and the second tapered portion 50 (where the first tapered portion 44 and the second tapered portion 50 oppose to each other).

In order to diffusion-bond the first magnetic member 34 and the non-magnetic member 32 by means of hot isostatic pressing, it is necessary that the bonding surface between the first magnetic member 34 and the non-magnetic member 32 are prevented from oxidization. In order to prevent oxidization caused by entering of atmospheric air, it is preferable that the connecting region between the non-magnetic member 32 and the first magnetic member 34 is covered with argon gas, carbon dioxide gas or the like and welding is performed clockwise or counterclockwise along the outer circumferential portion 54 to establish a bond which provides sealing without trapping any atmospheric air. By making a bond through clockwise or counterclockwise welding under coverage with argon gas, carbon dioxide gas or the like, it is possible to eliminate atmospheric air, which would lead to unsuccessful diffusion bonding during hot isostatic pressing, from the connecting region between the non-magnetic member 32 and the first magnetic member 34.

A preferable method for bonding is arc welding, and more preferably TIG welding. In arc welding, welding is performed while an arc generated from a welding wire is covered by argon gas, carbon dioxide gas or the like, and therefore atmospheric air does not enter, keeping the bonding surface between the first magnetic member 34 and the non-magnetic member 32, and the bonding surface between the second magnetic member 36 and the non-magnetic member 32 less susceptible to atmospheric oxidization. In TIG welding, a tungsten electrode is brought closely to the work, so that heat from electric discharge melts the work. Since the heat spreads easily in the work's surface directions in this welding, it is possible to widely and reliably bond the connecting region on the outer circumference side.

By welding all around the outer circumferential portion 54, a first bonding portion 56 is formed which bonds the non-magnetic member 32 and the first magnetic member 34 to each other along the outer circumferential portion 54, sealing the connecting region between the non-magnetic member 32 and the first magnetic member 34. In the region where the first bonding portion 56 is formed, there can be a case in which the non-magnetic member 32 and the first magnetic member 34 are deformed or altered by the formation of the bonding portion. For this reason, an axial dimension L1 (see FIG. 2) of the first annular portion 40 and an axial dimension L2 (see FIG. 2) of a disc-shaped portion 49 of the first projected portion 48 are set to be longer by some extent (for example, approximately 2 through 10 mm depending on the material of the non-magnetic member 32 and the first magnetic member 34 and the welding method), and the two dimensions are substantially equal to each other. In other words, the first annular portion 40 is formed so that the first tapered portion 44 and the second tapered portion 50 are more apart from the first bonding portion 56 than in the case where the first annular portion 40 is not provided. This makes it possible to prevent the first bonding portion 56 from being formed onto the first tapered portion 44 and the second tapered portion 50, to ensure that the first tapered portion 44 and the second tapered portion 50 maintain their shape and characteristics without being deformed or altered, leading to successful diffusion bonding provided by the hot isostatic pressing process to be performed later.

Likewise, in order to prevent atmospheric air from entering the connecting region between the non-magnetic member 32 and the second magnetic member 36 (where a main surface 39 on the second end region side of the main body 38 and the second annular portion 42 oppose to the second projected portion 52), welding is performed along an outer circumferential portion 58 of the connecting region. By welding all around the outer circumferential portion 58, a second bonding portion 60 is formed which bonds the non-magnetic member 32 and the second magnetic member 36 to each other along the outer circumferential portion 58, sealing the connecting region between the non-magnetic member 32 and the second magnetic member 36. In the region where the second bonding portion 60 is formed, there can be a case in which the non-magnetic member 32 and the second magnetic member 36 are deformed or altered by the formation of the welding portion. For this reason, an axial dimension L3 (see FIG. 2) of the second annular portion 42 and an axial dimension L4 (see FIG. 2) of the second projected portion 52 are set to be longer by some extent (for example, approximately 2 through 10 mm depending on the material of the non-magnetic member 32 and the second magnetic member 36 and the welding method), and the two dimensions are substantially equal to each other. In other words, the second annular portion 42 is formed so that the main surface 39 of the main body 38 and a main surface 53 of the second projected portion 52 are more apart from the second bonding portion 60 than in the case where the second annular portion 42 is not provided. This makes it possible to prevent the second bonding portion 60 from being formed onto the main surface 39 of the main body 38 and the main surface 53 of the second projected portion 52, to ensure that the main surface 39 of the main body 38 and the main surface 53 of the second projected portion 52 maintain their shape and characteristics without being deformed or altered by the formation of the welding portion, leading to successful diffusion bonding provided by the hot isostatic pressing process to be performed later.

By increasing the axial dimension L1 of the first annular portion 40, the axial dimension L2 of the disc-shaped portion 49 in the first projected portion 48, the axial dimension L3 of the second annular portion 42, and the axial dimension L4 of the second projected portion 52, it becomes possible to decrease an allowance which must be machined in the fifth step which will be described later.

It should be noted here that the first bonding portion 56 and the second bonding portion 60 are formed into a size (depth) and at locations which allow complete removal thereof in the fifth step so that they will not affect (be included in) the final shape of the sleeve 10. The same applies to first bonding portions 56a, 56b and second bonding portions 60a, 60b in other embodiments shown in FIG. 8 through FIG. 10 which will be described later.

Figure 5:
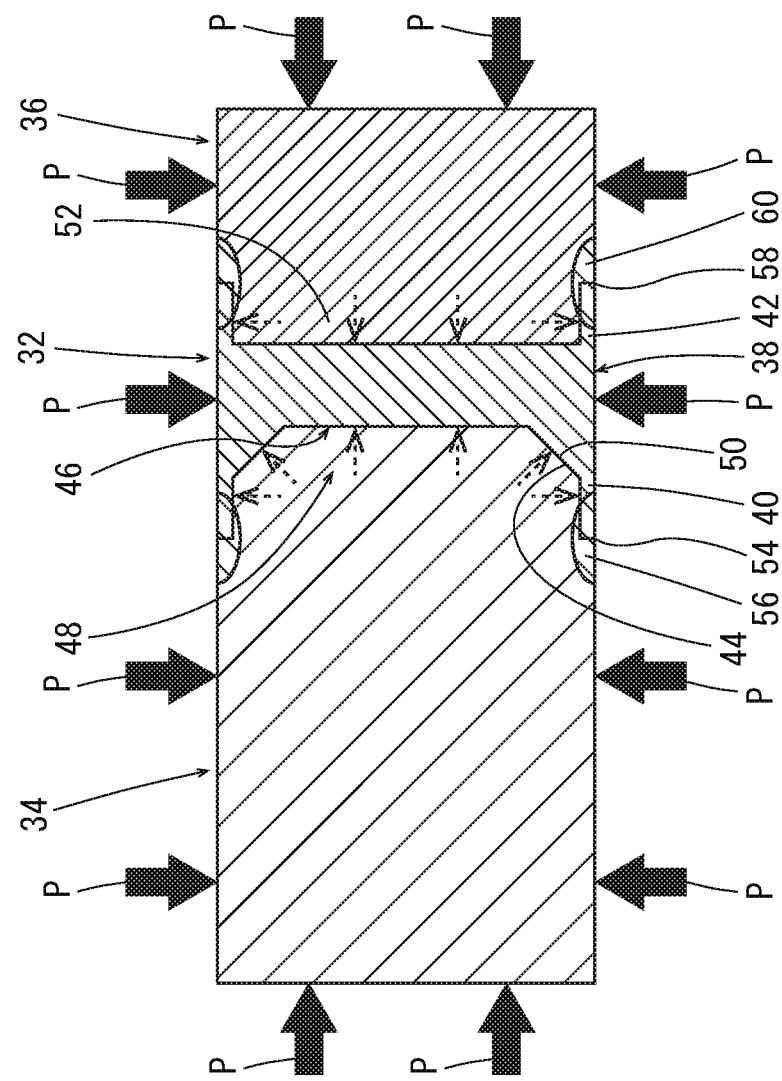
FIG. 5 is an explanatory sectional view which shows the non-magnetic member, the first magnetic member and the second magnetic member during a hot isostatic pressing process.

Referring to FIG. 5, as the fourth step, the non-magnetic member 32, the first magnetic member 34, and the second magnetic member 36 which were bonded with the first bonding portion 56 and the second bonding portion 60 in the previous step are placed in a furnace (not illustrated) and the hot isostatic pressing process is performed. For example, in a case where the non-magnetic member 32 is made of a stainless steel (SUS304), and the first magnetic member 34 and the second magnetic member 36 are made of a soft steel (SS400), conditions for the hot isostatic pressing process include a temperature range of 850 degrees Celsius through 1100 degrees Celsius, a pressure range of 100 MPa through 130 MPa, and a time range of 1 hour through 3 hours, in consideration of achievement of more reliable bonding and influence on the pressurized heat treatment furnace. In the hot isostatic pressing process, the non-magnetic member 32, the first magnetic member 34 and the second magnetic member 36 receive a pressure P from outside. In the connecting region between the non-magnetic member 32 and the first magnetic member 34 sealed by the first bonding portion 56, the first magnetic member 34 and the non-magnetic member 32 are heated and pressed under high temperatures and high pressures, whereby the first magnetic member 34 and the non-magnetic member 32 are compressed and diffusion of atoms takes place between the first magnetic member 34 and the non-magnetic member 32. This brings the non-magnetic member 32 and the first magnetic member 34 into a strong bond. In this process, the first tapered portion 44 and the second tapered portion 50 are also subjected to high pressure compression and mutual diffusion, thereby brought into a strong bond.

Likewise, in the connecting region between the non-magnetic member 32 and the second magnetic member 36 sealed by the second bonding portion 60, the second magnetic member 36 and the non-magnetic member 32 are heated and pressed under high temperatures and high pressures, whereby the second magnetic member 36 and the non-magnetic member 32 are compressed and diffusion of atoms takes place between the second magnetic member 36 and the non-magnetic member 32. This brings the non-magnetic member 32 and the second magnetic member 36 into a strong bond.

It should be noted here that stainless steel (SUS304) has a higher hardness than soft steel (SS400), and therefore when the non-magnetic member 32 made of stainless steel (SUS304) and the first magnetic member 34 and the second magnetic member 36 made of iron (soft steel (SS400)) are subjected to the hot isostatic pressing process under the conditions mentioned above, the non-magnetic member 32 is not softened easily while the first magnetic member 34 and the second magnetic member 36 are softened easily. Therefore, after the hot isostatic pressing process, the non-magnetic member 32 keeps its shape while the first magnetic member 34 and the second magnetic member 36 deform slightly, following the shape of the non-magnetic member 32. Since the shape of the first magnetic member 34 and the second magnetic member 36 follows the shape of the non-magnetic member 32 as mentioned, it is preferable that the non-magnetic member 32 is prepared to have a high dimensional accuracy. Also, it is preferable that the first magnetic member 34 and the second magnetic member 36 have a lower hardness than that of the non-magnetic member 32. Materials for the combination of the non-magnetic member 32 and the first magnetic member 34 and the second magnetic member 36 as the above include the followings: For the non-magnetic member 32, in addition to the already-mentioned SUS304, non-magnetic stainless steel such as SUS303, SUS316 and SUS321; Cu alloys such as brass and bronze; and aluminum alloys may be used. For the first magnetic member 34 and the second magnetic member 36, other kinds of iron in addition to the already-mentioned SS400 and magnetic stainless steel such as SUS430 may be used.

Figure 6:
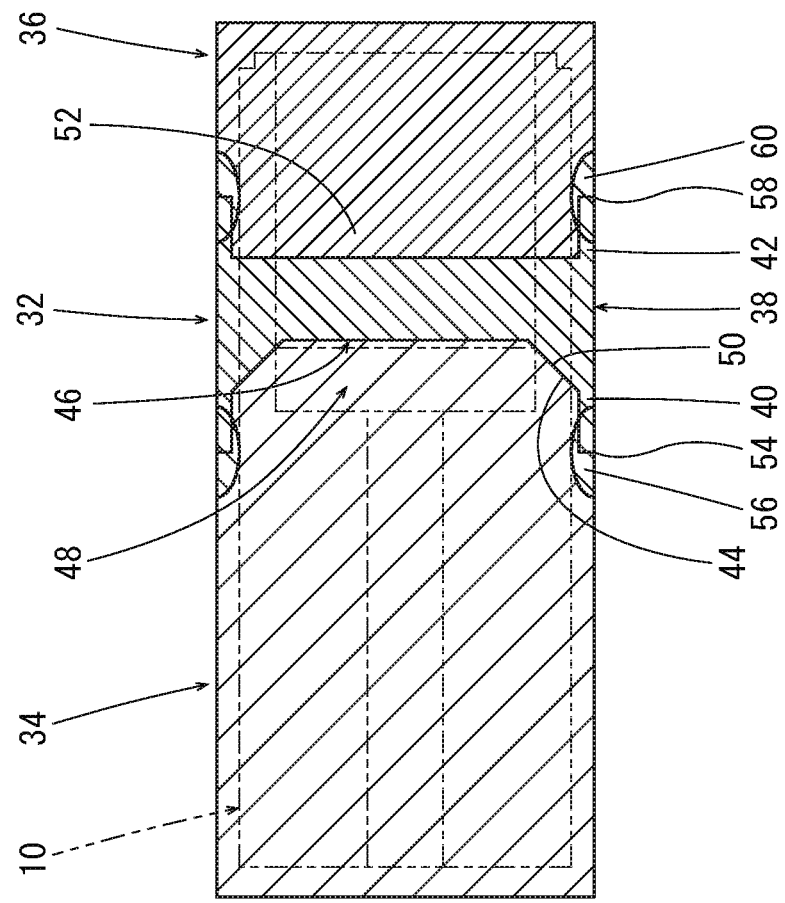
FIG. 6 is an explanatory sectional view which shows cutting locations in the non-magnetic member, the first magnetic member and the second magnetic member.

Referring to FIG. 6, finally, as the fifth step, cutting is performed to the non-magnetic member 32, the first magnetic member 34 and the second magnetic member 36, to leave the sleeve 10 shown in alternate long and two short dashes lines. In order to remove the first bonding portion 56 and the second bonding portion 60, a cutting operation is performed around the outer circumference of the non-magnetic member 32, the first magnetic member 34 and the second magnetic member 36. Also, cutting is performed to the first axial end region of the first magnetic member 34 and the second axial end region of the second magnetic member 36. Further, cylindrical cutting is performed axially of the second magnetic member 36, from the second end region side of the second magnetic member 36 to part of the first projected portion 48 of the first magnetic member 34. Then, from there, a through-hole is made to penetrate through the first magnetic member 34 to the first axial end region thereof. As described, the non-magnetic member 32, the first magnetic member 34 and the second magnetic member 36 are made hollow. In this process, at least part of the diffusion-bonded region in the first tapered portion 44 and the second tapered portion 50 is left uncut.

Figure 7:
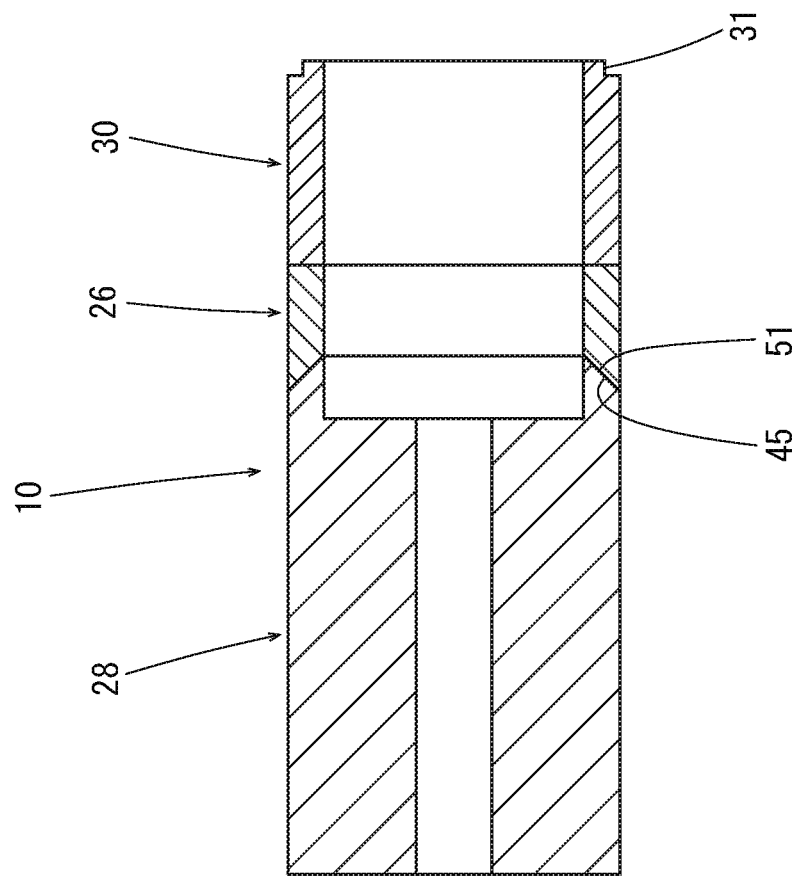
FIG. 7 is a sectional view which shows a sleeve manufactured in a method of manufacturing a solenoid sleeve according to an embodiment of the present invention.

Referring to FIG. 6 and FIG. 7, the above-described fifth step brings the non-magnetic member 32 into the annular non-magnetic body 26 which includes part 45 of the first tapered portion 44 at its first axial end region. The first magnetic member 34 becomes the hollow first magnetic body 28 which includes the part 51 of the second tapered portion 50. The part 51 of the second tapered portion 50 included in the first magnetic body 28 is diffusion-bonded to the part 45 of the first tapered portion 44 which is included in the non-magnetic body 26 at the first axial end region of the non-magnetic body 26. The second magnetic member 36 becomes the hollow second magnetic body 30 which is diffusion-bonded to a second axial end region of the non-magnetic body 26. Thus, the cylindrical sleeve 10 is obtained which is formed by sandwiching the non-magnetic body 26 between the first magnetic body 28 and the second magnetic body 30.

It should be noted here that an end region of the second magnetic body 30 side is formed with a step 31 for increased grounding area to the lid member 12 and for stronger connection between the lid member 12 and the sleeve 10 by welding when assembling into the solenoid 100.

According to the method for manufacturing the sleeve 10 as has been described, in the third step, the first bonding portion 56 which bonds the non-magnetic member 32 and the first magnetic member 34 is formed to seal the connecting region between the non-magnetic member 32 and the first magnetic member 34 that includes the fitting region between the first tapered portion 44 and the second tapered portion 50; and the second bonding portion 60 which bonds the non-magnetic member 32 and the second magnetic member 36 is formed to seal the connecting region between the non-magnetic member 32 and the second magnetic member 36. Thereafter, in the fourth step, the hot isostatic pressing process is performed for establishing diffusion-bonding between the non-magnetic member 32 and the first magnetic member 34 under compression, and diffusion-bonding between the non-magnetic member 32 and the second magnetic member 36 under compression. Therefore, it is possible to increase bonding strength between the non-magnetic member 32, the first magnetic member 34 and the second magnetic member 36 without causing alteration of the angles of the first tapered portion 44 and of the second tapered portion 50. Also, there is no need for vacuum sealing which would require, e.g., a separately prepared capsule, to perform the hot isostatic pressing process, which makes it easy to manufacture the sleeve 10 and makes it possible to reduce cost. Further, there is no need to grind off the capsule and the like which become no longer necessary after the hot isostatic pressing process. Therefore, it is possible to perform machining processes accurately and easily. Also, even if the first bonding portion 56 and the second bonding portion 60 become altered or deformed as a result of the bonding process, the first bonding portion 56 and the second bonding portion 60 are removed in the fifth step, so it is possible to prevent the sleeve 10, and eventually the solenoid 100, from being lowered in quality. Therefore, it is possible to obtain the sleeve 10 of the solenoid 100 which has the non-magnetic body 26 of the desired shape and is suitable for use in high pressure environments, easily at a low cost.

By pressing the first magnetic member 34 into the first annular portion 40, it is possible to connect the first magnetic member 34 to the non-magnetic member 32 so as not to come off easily. Therefore, it is possible to more reliably diffusion-bond the non-magnetic member 32 and the first magnetic member 34 to each other when the non-magnetic member 32 and the first magnetic member 34 are subjected to the hot isostatic pressing process. Likewise, by pressing the second magnetic member 36 into the second annular portion 42, it is possible to connect the second magnetic member 36 to the non-magnetic member 32 so as not to come off easily. Therefore, it is possible to more reliably diffusion-bond the non-magnetic member 32 and the second magnetic member 36 to each other when the non-magnetic member 32 and the second magnetic member 36 are subjected to the hot isostatic pressing process.

By forming the first annular portion 40 and the second annular portion 42 longer by some extent, the first tapered portion 44 and the second tapered portion 50 are made sufficiently away from the first bonding portion 56, and in addition, the second bonding portion 60 is made sufficiently away from the main surface 39 of the main body 38 and the main surface 53 of the second projected portion 52, making it unnecessary to increase the diameter of the non-magnetic member 32, the diameter of the first magnetic member 34 and the diameter of the second magnetic member 36. Since it is possible to reduce the size (outer diameters) of the non-magnetic member 32, the first magnetic member 34 and the second magnetic member 36, the arrangement makes it possible to reduce the amount of work necessary to grind off part which becomes unnecessary after the hot isostatic pressing process.

By using arc welding for formation of the first bonding portion 56 and the second bonding portion 60, the bonding surface between the first magnetic member 34 and the non-magnetic member 32 and the bonding surface between the second magnetic member 36 and the non-magnetic member 32 become less susceptible to oxidization by atmospheric air. This makes it possible to achieve good diffusion bonding by the hot isostatic pressing process in the subsequent fourth step, between the first magnetic member 34 and the non-magnetic member 32, and between the second magnetic member 36 and the non-magnetic member 32.

By using arc welding provided by TIG welding, it becomes possible to make a wide and reliable bond in the connecting region on the outer circumference side, thereby easily and reliably sealing the connecting region between the non-magnetic member 32 and the first magnetic member 34 and the connecting region between the non-magnetic member 32 and the second magnetic member 36. Therefore, it is possible to reliably diffusion-bond the non-magnetic member 32 and the first magnetic member 34 to each other, and the non-magnetic member 32 and the second magnetic member 36 to each other by the hot isostatic pressing process. Also, in TIG welding, heat tends to spread in surface directions and does not tend to make a bond deep inside the connecting region. This makes it possible to reliably bond only necessary areas.

By using a solenoid sleeve according to the present invention, and employing publicly known method for manufacturing, it is possible to manufacture the solenoid suitable for the proportional solenoid depicted in FIG. 1 for example, and many other types of solenoids. A solenoid including a sleeve according to the present invention is suitable for use in a high pressure environment.

Embodiment Example

Under the conditions to be described below, a sleeve was made according to the present invention and a tensile strength test and a leakage test were performed to evaluate the bonding strength achieved by the present invention.
(Tensile Strength)

First, like in FIG. 2, the non-magnetic member made of a non-magnetic stainless steel (SUS304) and having the first tapered portion (taper angle=45 degrees) recessing with a decreasing diameter from the first axial end region side toward the second axial end region side; the first magnetic member made of a soft steel (SS400) and having the second tapered portion of a decreasing diameter from its first axial end region side toward the second axial end region side; and the second magnetic member made of the same soft steel (SS400) as the first magnetic member were prepared.

Next, like in FIG. 3, the second tapered portion was fitted into the first tapered portion whereby the first magnetic member was connected to the first axial end region of the non-magnetic member, and the second magnetic member was connected to the second axial end region of the non-magnetic member.

Next, like in FIG. 4, the first bonding portion was formed which bonded the non-magnetic member and the first magnetic member along the outer circumferential portion of the connecting region between the non-magnetic member and the first magnetic member including the fitting region between the first tapered portion and the second tapered portion, to seal the connecting region; and the second bonding portion was formed which bonded the non-magnetic member and the second magnetic member along the outer circumferential portion of the connecting region between the non-magnetic member and the second magnetic member, to seal the connecting region. In this process, welding of the bonding portions was performed by means of TIG welding.

Next, like in FIG. 5, the non-magnetic member, the first magnetic member and the second magnetic member which were bonded in the third step were placed directly in a HIP processing apparatus and a hot isostatic pressing process was performed to diffusion-bond the non-magnetic member and the first magnetic member with each other and to diffusion-bond the non-magnetic member and the second magnetic member with each other.

The hot isostatic pressing process was performed under a temperature of 1000 degrees Celsius, a pressure of 113 MPa and a processing time of two hours.

Thereafter, the diffusion-bonded piece of first magnetic member, non-magnetic member and second magnetic member was machined into a specimen having an axial length of 105 mm and a diameter of 6 mm. A center region of the non-magnetic member had an axial length of 2.5 mm.

The specimen's tensile strength was measured by a tensile testing machine and a tensile strength of 445 N/mm$^2$ was obtained, which is as high as a general value for SS400. Fracture occurred not at the bonding portion but in the magnetic member provided by SS400, indicating that the non-magnetic member, the first magnetic member and the second magnetic member were strongly bonded to each other.

(Leakage Test)

Also, using the same method for making the specimen for the above-described tensile test, the first magnetic member, the non-magnetic member and the second magnetic member were diffusion-bonded, and then, the non-magnetic member, the first magnetic member and the second magnetic member were hollowed and the first bonding portion and the second bonding portion were removed to leave at least part of the diffusion-bonded portion between the first tapered portion and the second tapered portion. Thereafter, a cylindrical sleeve, like in FIG. 7, formed by sandwiching the non-magnetic body between the first magnetic body and the second magnetic body was obtained.

A section was observed and found that the cylindrical sleeve had an axial length of 105 mm, an outer diameter of 22 mm, an inner diameter of 17 mm (as a space for the movable iron core to move) and 9 mm (as a space for the rod to move). The non-magnetic body had an axial length (inner diameter side contacted by the movable iron core) of 2.5 mm and an angle of the tapered portion of the non-magnetic body was 45 degrees. No alteration was found in the angle of the tapered portion.

Also, the cylindrical sleeve had its two axial ends sealed and was placed in a leak tester chamber and then the pressure inside the chamber was increased to 125 MPa. No leakage was found from the bonding portion and a crack was found in the soft steel (SS400). From these, it was confirmed that the non-magnetic body, the first magnetic body and the second magnetic body were strongly bonded.

From the above, it was confirmed that the sleeve according to the present invention sufficiently meets specifications for a high pressure solenoid sleeve.

(Making a Solenoid)

Using the sleeve which was made in the above-described Embodiment Example, a solenoid as shown in FIG. 1 was built. Specifically, the spacer 24 was disposed in the cylindrical sleeve; an assembly of the movable iron core 20 and the rod 22 which penetrates the movable iron core 20 was inserted into the sleeve movably in the axial direction, and then the lid member 12 was welded to the sleeve. Then, the coil 14 which was molded with the resin member 16 to surround the region of the sleeve made of the non-magnetic body was disposed and the case 18 was placed to complete the making of solenoid. Since the completed solenoid makes use of the sleeve which was obtained in the above-described Embodiment Example, the solenoid is suitable for use under a high pressure environment.

In prior art, it is impossible to bond the non-magnetic member and the magnetic member at the tapered portion to endure high pressures. Thus, a conventional solenoid (disclosed in JP-A 2012-38780 for example) uses a sleeve in which the first magnetic member and the second magnetic member have their outer circumferential portions formed with recesses and the non-magnetic member is fitted into these recesses and then bonding is performed by TIG welding for example.

In such a conventional sleeve, the movable iron core and the first magnetic member have a smaller area of opposing surfaces (area of attraction) than the sleeve in FIG. 7 according to the present invention, and therefore, a solenoid using such a sleeve is inferior in its attraction characteristics than a solenoid which uses the sleeve offered by the present invention.

Since the present invention is capable of increasing the bonding strength between the non-magnetic body, the first magnetic body and the second magnetic body, it is possible in the sleeve according to the present invention, to make a wall surrounding the movable iron core relatively thin. This means that in comparison to other solenoids of the same size, it is possible to increase the area of opposed surfaces (area of attraction) between the movable iron core and the first magnetic body in the axial direction of the solenoid. Therefore, it is possible to obtain a large attraction by using a sleeve according to the present invention. Also, in cases where a solenoid must achieve a specific level of attraction, use of a sleeve according to the present invention makes it possible to decrease the size of the solenoid. Also, by using a sleeve according to the present invention, it becomes possible to easily set the shape of taper to a desired angle. Therefore, it is possible to obtain a solenoid which has a good proportional characteristic of attraction.

Figure 8:
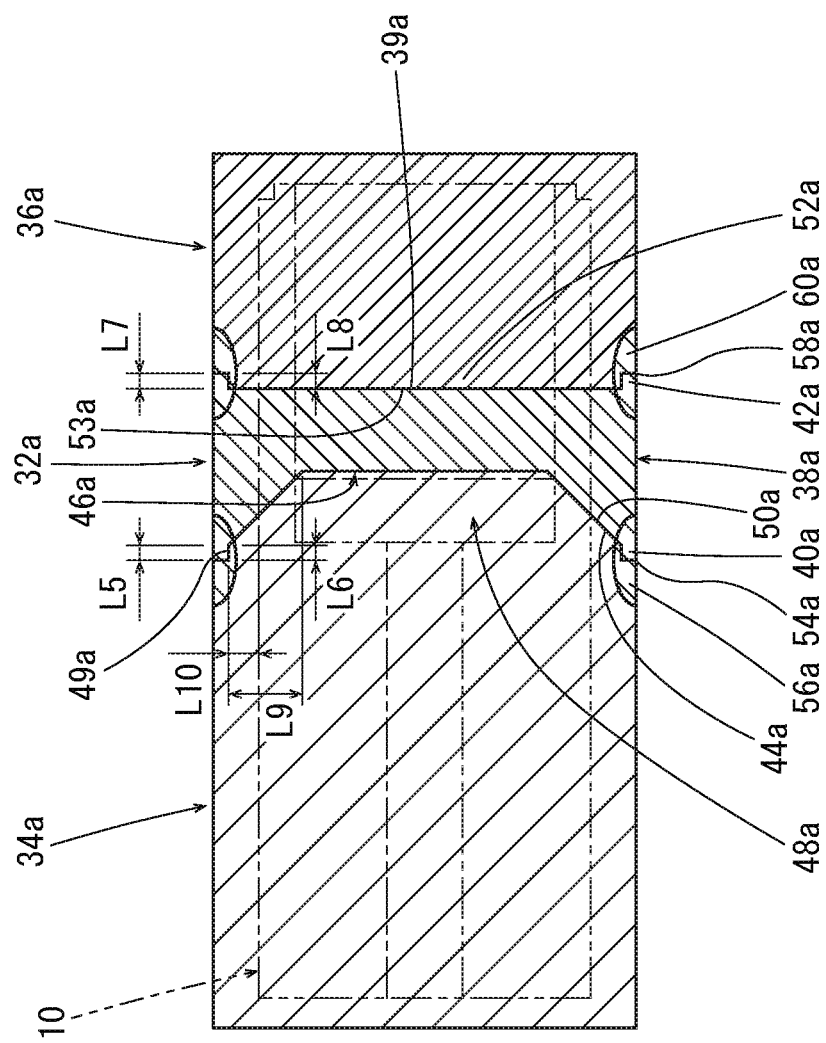
FIG. 8 is an explanatory sectional view which shows a non-magnetic member, a first magnetic member and a second magnetic member according to another embodiment.

It should be noted here that the non-magnetic member, the first magnetic member and the second magnetic member may be provided by a non-magnetic member 32a, a first magnetic member 34a and a second magnetic member 36a as shown in FIG. 8. Constituent elements shown in FIG. 8 are indicated with the same reference numbers as the corresponding ones in the previous embodiment, with a letter "a" added at the end of the number, and no details are repeated herein.

Referring to FIG. 8, in the present embodiment, part of the first tapered portion 44a and of the second tapered portion 50a to be left after the cutting process in the fifth step (see FIG. 7; mutual connecting surface between the non-magnetic body 26 and the first magnetic body 28, i.e., areas corresponding to the part 45 of the first tapered portion 44 and the part 51 of the second tapered portion 50) are separated from the first bonding portion 56a by an increased distance, by increasing a radial dimension L9 of the first tapered portion 44a and the second tapered portion 50a by some extent and accordingly by increasing the outer diameter of the non-magnetic body 32a (the first annular portion 40a) and the outer diameter of the first magnetic member 34a by some extent (specifically, the part of the first tapered portion 44a and the second tapered portion 50a which will be subjected to the cutting process in the fifth step has a radial dimension L10 of, for example, approximately 1 through 3 mm depending on the material of the non-magnetic member 32a and the first magnetic member 34a and the welding method). This makes sure that the part of the first tapered portion 44a and of the second tapered portion 50a to be left after the cutting process in the fifth step is not deformed or altered by the first bonding portion 56a, but able to keep their shape and characteristics.

Also, part of the main surface 39a in the main body 38a and of the main surface 53a in the second projected portion 52a which is to be left after the cutting process in the fifth step (see FIG. 7; part corresponding to the mutual connecting surface between the non-magnetic body 26 and the second magnetic body 30) is separated from the second bonding portion 60a by an increased distance by increasing the diameter of the non-magnetic member 32a (the second annular portion 42a) and the diameter of the second magnetic member 36a. This makes sure that the part of the main surface 39a in the main body 38a and of the main surface 53a in the second projected portion 52a which will be left after the cutting process in the fifth step is not deformed or altered by the second bonding portion 60a, but able to keep their shape and characteristics.

As the radial dimension L9 of the first tapered portion 44a and the second tapered portion 50a is increased, the diameter of the non-magnetic member 32a (the first annular portion 40a and the second annular portion 42a), the diameter of the first magnetic member 34a and the diameter of the second magnetic member 36a are also increased. Therefore, it is possible, without depending upon the axial dimension of the first annular portion 40a and the second annular portion 42a, to make the part of the first tapered portion 44a and of the second tapered portion 50a which will be left after the cutting process in the fifth step sufficiently away from the first bonding portion 56a, and to make the part of the main surface 39a in the main body 38a and the part of the main surface 53a in the second projected portion 52a which will be left after the cutting process in the fifth step sufficiently away from the second bonding portion 60a. Therefore, without increasing the axial dimension L5 of the first annular portion 40a, the axial dimension L6 of the disc-shaped portion 49a in the first projected portion 48a, the axial dimension L7 of the second annular portion 42a, and the axial dimension L8 of the second projected portion 52a, it is possible to easily make the first bonding portion 56a and the second bonding portion 60a not to affect (to be included in) the final shape of the sleeve 10.

Whichever one of the Embodiment shown in FIG. 6 and the Embodiment shown in FIG. 8 may be selected appropriately in consideration into materials of the non-magnetic member, the first magnetic member and the second magnetic member, means for bonding and means for machining.

In the Embodiments described above, description was made for cases where the first annular portion and the second annular portion are formed. However, the first annular portion and the second annular portion need not necessarily be formed. Also, for a positioning purpose, recesses/projections may be formed on regions of the non-magnetic member, the first magnetic member and the second magnetic member which will be cut and removed in a later step.

Figure 9:
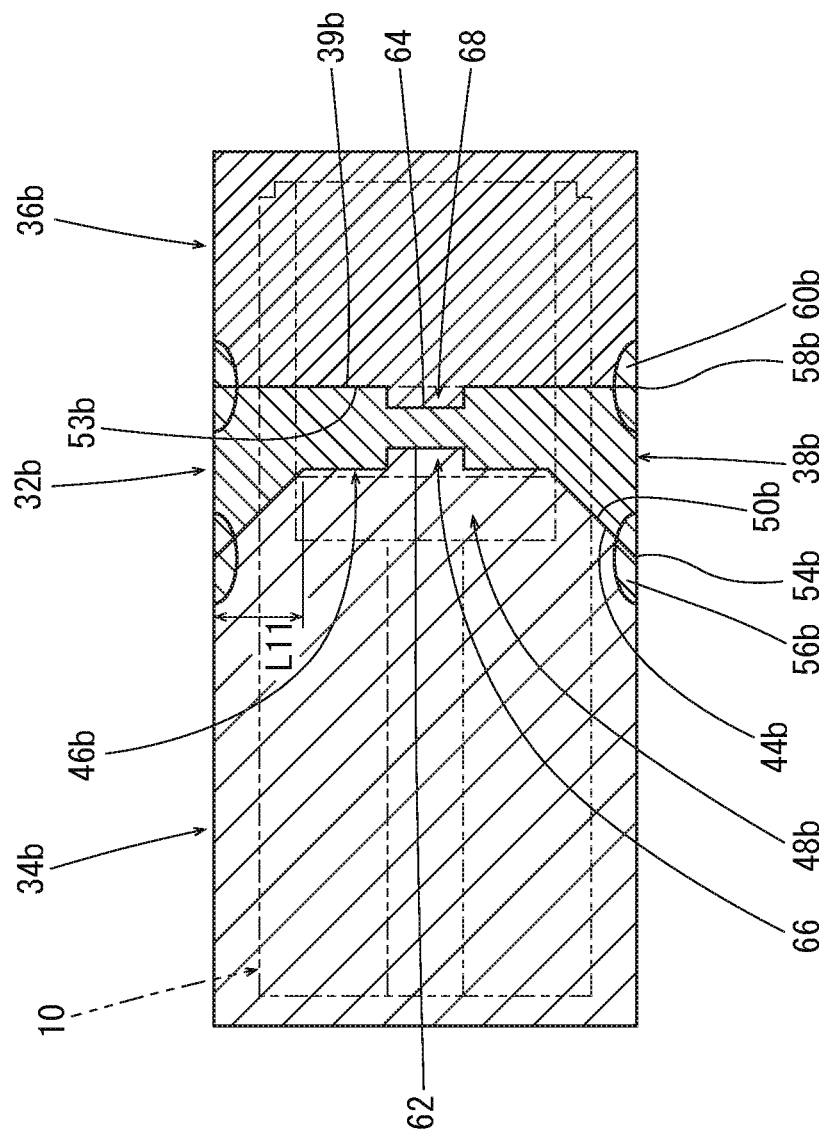
FIG. 9 is an explanatory sectional view which shows a non-magnetic member, a first magnetic member and a second magnetic member according to still another embodiment.

For example, the non-magnetic member, the first magnetic member and the second magnetic member may be provided by a non-magnetic member 32b, a first magnetic member 34b and a second magnetic member 36b as shown in FIG. 9. Constituent elements shown in FIG. 9 are indicated with the same reference numbers as in the embodiment shown in FIG. 8, with the letter "a" at the end of the number replaced by a letter "b", and no details are repeated herein.

The non-magnetic member 32b differs from the non-magnetic member 32a in that it does not have the first annular portion 40a and the second annular portion 42a but has a third recess 62 and a fourth recess 64. The first magnetic member 34b differs from the first magnetic member 34a in that it does not have the disc-shaped portion 49a but has a third projected portion 66. The second magnetic member 36b differs from the second magnetic member 36a in that it does not have the second projected portion 52a but has a fourth projected portion 68. It should be noted here that the first tapered portion 44b and the second tapered portion 50b have their radial dimension L11 greater than the radial dimension L9 (see FIG. 8) of the first tapered portion 44a and the second tapered portion 50a. The third recess 62 is formed at a center of the first recess 46b. The fourth recess 64 is formed at a center of the main surface 39b of the non-magnetic member 32b. The third projected portion 66 is formed at a center of a tip end surface of the first projected portion 48b so as to be pressed into the third recess 62. The fourth projected portion 68 is formed at a center of a main surface 53b of the second magnetic member 36b so as to be pressed into the fourth recess 64.

In the present embodiment, by pushing the third projected portion 66 into the third recess 62, the first magnetic member 34b is easily positioned with respect to the non-magnetic member 32b; and by pushing the fourth projected portion 68 into the fourth recess 64, the second magnetic member 36b is easily positioned with respect to the non-magnetic member 32b.

Figure 10:
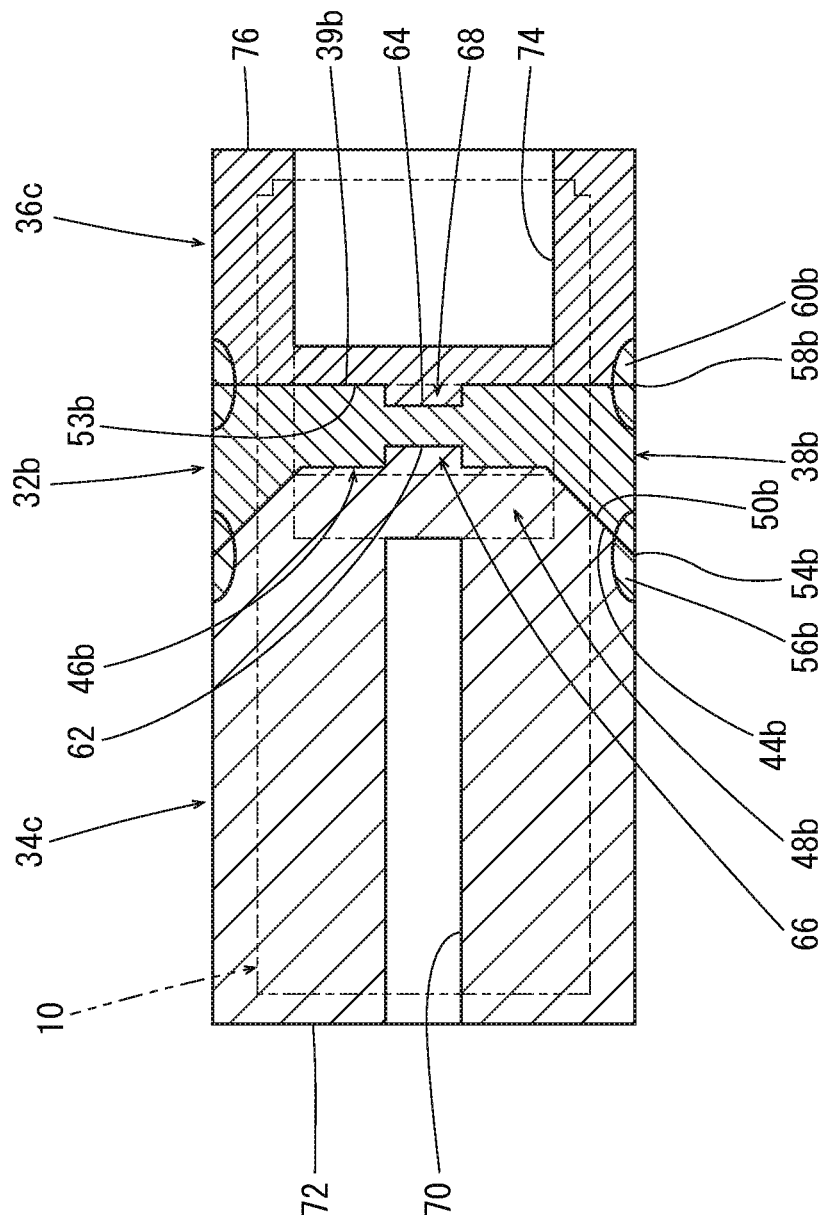
FIG. 10 is an explanatory sectional view which shows a non-magnetic member, a first magnetic member and a second magnetic member according to still another embodiment.

Also, referring to FIG. 10, the first magnetic member 34b may be replaced with the first magnetic member 34c, and the second magnetic member 36b may be replaced with the second magnetic member 36c.

The first magnetic member 34c differs from the first magnetic member 34b in that it has a hollow 70. The second magnetic member 36c differs from the second magnetic member 36b in that it has a hollow 74. The hollow 70 extends axially of the first magnetic member 34c, from a center of a main surface 72 on the first end region side of the first magnetic member 34c. The space represented by the hollow 70 is the portion which would otherwise be cut off in the fifth step. The hollow 74 extends axially of the second magnetic member 36c, from a center of a main surface 76 on the second end region side of the second magnetic member 36c. The space represented by the hollow 74 is the portion which would otherwise be cut off in the fifth step. Other arrangements are identical with the embodiment in FIG. 9.

In the present embodiment, by forming the hollow 70 and the hollow 74 in advance, the amount which must be cut in the fifth step is decreased and it is possible to shorten the machining time.

In the Embodiment described earlier, part of the first tapered portion and the second tapered portion is removed in the fifth step in order to obtain the sleeve 10 of the final shape. This is not limiting, however. The first tapered portion, the second tapered portion and the sleeve of the final shape may be formed in such a way that the first tapered portion and the second tapered portion are not removed. For example, by increasing the thickness of the first annular portion so that the first tapered portion and the second tapered portion are sufficiently separate from the first bonding portion, it becomes possible to obtain the sleeve of the final shape by simply removing the first annular portion even if the first tapered portion and the second tapered portion are not removed.

In the Embodiment described earlier, description was made for cases where the first bonding portion and the second bonding portion are formed by TIG welding. This is not limiting, however. For example, the arc welding may be provided by MIG (Metal Inert Gas) welding or plasma welding. Also, bonding portion may be formed by means of brazing, laser welding or electronic beam welding.

The non-magnetic member, the first magnetic member and the second magnetic member should have their surface roughness Ra not lower than 0.4 for good bonding. More preferably, the surface roughness should not be lower than Ra 3.2.

Also, the non-magnetic member, the first magnetic member and the second magnetic member need not have the same surface roughness.

Conditions for the hot isostatic pressing process may be suitably set depending on the size of the sleeve to be manufactured; materials for the non-magnetic member, the first magnetic member and the second magnetic member; thickness ratio of each of the non-magnetic member, the first magnetic member and the second magnetic member; shape of the border region between the magnetic member and the non-magnetic member in order to obtain desired characteristics, etc.

The present invention being thus far described in terms of preferred embodiments, it is obvious that these may be varied in many ways within the scope and the spirit of the present invention. The scope of the present invention is only limited by the accompanied claims.

REFERENCE SIGNS LIST

10 Sleeve
12 Lid member
14 Coil
16 Resin member
18 Case
20 Movable iron core
22 Rod
24 Spacer
26 Non-magnetic body
28 First magnetic body
30 Second magnetic body
32, 32a, 32b Non-magnetic members
34, 34a, 34b, 34c First magnetic members
36, 36a, 36b, 36c Second magnetic members
38, 38a, 38b Main bodies
40, 40a First annular portions
42, 42a Second annular portions
44, 44a, 44b First tapered portions
46, 46a, 46b First recesses
48, 48a, 48b First projected portions
50, 50a, 50b Second tapered portions
52, 52a Second projected portions
54, 54a, 54b, 58, 58a, 58b Outer circumferential portions
56, 56a, 56b First bonding portions
60, 60a, 60b Second bonding portions
62 Third recess
64 Fourth recess
66 Third projected portion
68 Fourth projected portion
70, 74 Hollows
100 Solenoid

The invention claimed is:

1. A method for manufacturing a solenoid sleeve, comprising:

a first step of preparing a non-magnetic member including a first tapered portion recessing with a decreasing diameter from its first axial end region side toward its second axial end region side, a first magnetic member including a second tapered portion with a decreasing diameter from its first axial end region side toward its second axial end region side for fitting to the first tapered portion, and a second magnetic member;

a second step of fitting the second tapered portion the first tapered portion thereby, connecting the first magnetic member to the first axial end region of the non-magnetic member, and connecting the second magnetic member to the second axial end region of the non-magnetic member;

a third step of forming a first bonding portion which bonds the non-magnetic member and the first magnetic member along an outer circumferential portion of a connecting region between the non-magnetic member and the first magnetic member including a fitting region between the first tapered portion and the second tapered portion, to seal the connecting region, and forming a second bonding portion which bonds the non-magnetic member and the second magnetic member along an outer circumferential portion of a connecting region between the non-magnetic member and the second magnetic member, to seal the connecting region between the non-magnetic member and the second magnetic member;

a fourth step of performing a hot isostatic pressing process to the non-magnetic member, the first magnetic member and the second magnetic member bonded in the third step, to diffusion-bond the non-magnetic member and the first magnetic member with each other, and diffusion-bond the non-magnetic member and the second magnetic member with each other; and a fifth step of hollowing the non-magnetic member, the first magnetic member and the second magnetic member and removing the first bonding portion and the second bonding portion to leave at least part of the diffusion-bonded portion of the first, tapered portion and of the second tapered portion, thereafter obtaining a cylindrical sleeve formed by sandwiching a non-magnetic body between a first magnetic body and a second magnetic body; wherein the non-magnetic member includes a first annular portion protruding annularly at the first axial end region side of the non-magnetic member, and a second annular portion protruding annularly at the second axial end region side of the non-magnetic member;

in the second step, the first magnetic member is pressed into the first annular portion, thereby connected to the non-magnetic member, whereas the second magnetic member is pressed into the second annular portion, thereby connected to the non-magnetic member;

in the fifth step, removing the first bonding portion and the second bonding portion includes removing the whole first annular portion and the whole second annular portion; and by the fifth step, the non-magnetic member is brought into the annular non-magnetic body including at least part of the first tapered portion, the first magnetic member is brought into the hollow first magnetic body including at least part of the second tapered portion, at least part of the second tapered portion is diffusion-bonded to at least part of the first tapered portion at a first axial end region of the non-magnetic body, and the second magnetic member is brought into the hollow second magnetic body diffusion-bonded to a second axial end region of the non-magnetic body.

2. The method for manufacturing a solenoid sleeve according to claim 1, wherein the first bonding portion and the second bonding portion are formed by arc welding in the third step.

3. The method for manufacturing a solenoid sleeve according to claim 2, wherein the arc welding is provided by TIG welding.

* * * * *